United States Patent
Niederer

(10) Patent No.: US 9,226,458 B2
(45) Date of Patent: Jan. 5, 2016

(54) WINDING APPARATUS FOR COVERING OPENINGS IN WALL PORTIONS

(71) Applicant: Lock Antriebstechnik GmbH, Ertingen (DE)

(72) Inventor: Patrick Niederer, Riedlingen-Zweifaltendorf (DE)

(73) Assignee: Lock Antriebstechnik GmbH, Ertingen (DE)

( * ) Notice: Subject to any disclaimer, the term of this patent is extended or adjusted under 35 U.S.C. 154(b) by 0 days.

(21) Appl. No.: 14/075,212

(22) Filed: Nov. 8, 2013

(65) Prior Publication Data

US 2014/0216665 A1 Aug. 7, 2014

(30) Foreign Application Priority Data

Nov. 12, 2012 (DE) .......................... 10 2012 022 001

(51) Int. Cl.
| | |
|---|---|
| *A47G 5/02* | (2006.01) |
| *A01G 9/22* | (2006.01) |
| *E06B 9/40* | (2006.01) |
| *E06B 9/64* | (2006.01) |
| *E06B 9/66* | (2006.01) |

(52) U.S. Cl.
CPC . *A01G 9/227* (2013.01); *E06B 9/40* (2013.01); *E06B 9/64* (2013.01); *E06B 9/66* (2013.01)

(58) Field of Classification Search
CPC ..................................... E06B 9/64; E06B 9/70
USPC ......... 160/122, 242, 243, 244, 247, 250, 253, 160/254
See application file for complete search history.

(56) References Cited

U.S. PATENT DOCUMENTS

| | | | | | |
|---|---|---|---|---|---|
| 3,306,344 | A | * | 2/1967 | Youngs .......................... | 160/241 |
| 5,520,236 | A | * | 5/1996 | Thomas et al. ................ | 160/120 |
| 5,524,693 | A | * | 6/1996 | Hamilton ....................... | 160/243 |
| 6,612,359 | B1 | * | 9/2003 | Moreau .......................... | 160/120 |
| 6,978,822 | B2 | * | 12/2005 | Schoonen ...................... | 160/310 |
| 7,152,653 | B1 | * | 12/2006 | Kubly et al. .................. | 160/120 |
| 8,459,329 | B2 | * | 6/2013 | Connerley .................... | 160/243 |

FOREIGN PATENT DOCUMENTS

| | | |
|---|---|---|
| DE | 29 824 480 U1 | 3/2001 |
| DE | 298 24 480 U1 | 5/2001 |

(Continued)

OTHER PUBLICATIONS

European Search Report mailed Mar. 21, 2014 (Application No. 13005091.7).

(Continued)

*Primary Examiner* — Blair M Johnson
(74) *Attorney, Agent, or Firm* — Burr & Brown, PLLC

(57) ABSTRACT

The invention relates to a winding apparatus for covering an opening. According to the invention transmitting means are provided for interaction between a drive unit and a winding element, having a windable pulling element which is received between a first rotatable winding body and a second rotatable winding body in such a manner that the pulling element can be wound and unwound by way of the first winding body which is driveable by the drive unit, wherein the second winding body and the winding element are rotatably coupled together and wherein the cover element can be wound by way of an unwinding operation of the pulling element from the second winding body.

13 Claims, 4 Drawing Sheets

(56) References Cited

FOREIGN PATENT DOCUMENTS

| | | | |
|---|---|---|---|
| DE | 20 2004 005 934 U1 | 6/2004 | |
| DE | 20 2004 005 934 U1 | 7/2004 | |
| EP | 1 388 637 A1 | 2/2004 | |
| EP | 1 388 637 AI | 2/2004 | |
| WO | 2005/010313 A1 | 2/2005 | |

OTHER PUBLICATIONS

German Search Report (Application No. 10 2012 022 001.4) dated Aug. 27, 2013.

* cited by examiner

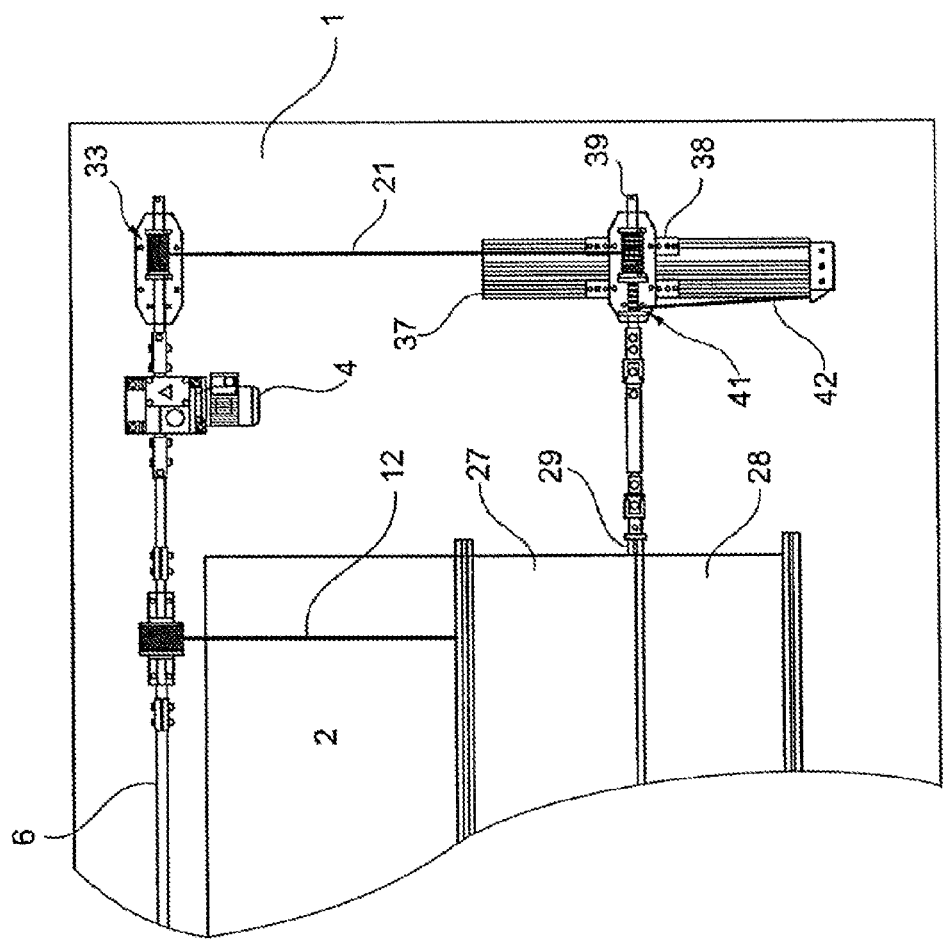
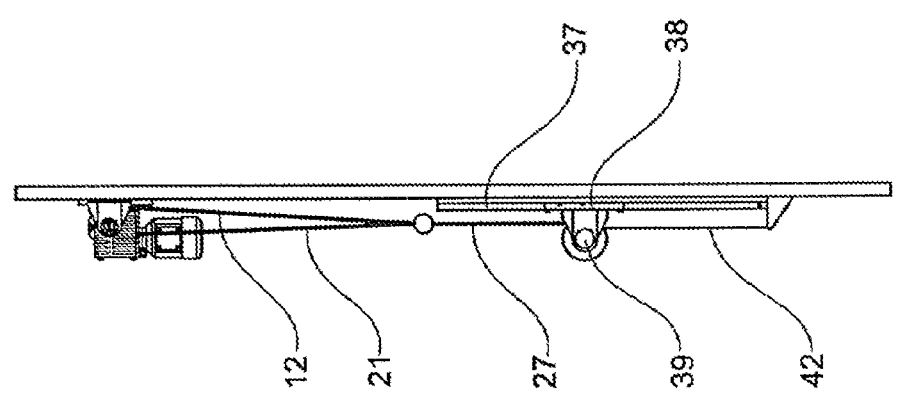

WINDING APPARATUS FOR COVERING OPENINGS IN WALL PORTIONS

CROSS REFERENCE TO RELATED APPLICATION

This application claims the benefit under 35 USC §119(a)-(d) of German Application No. 10 2012 022 001.4 filed Nov. 12, 2012, the entirety of which is incorporated herein by reference.

FIELD OF THE INVENTION

The invention relates to a winding apparatus for covering openings in wall portions.

BACKGROUND OF THE INVENTION

Winding apparatuses or winding Venetian shutters or shading systems having a flat, flexible cover element, for example, a tarpaulin or film, for sometimes covering an opening on a portion of a wall or a roof are known. These types of arrangements serve, in particular, for regulating an exchange of heat or air or an incidence of light by means of the opening for example in buildings in agriculture such as stables, greenhouses or storage rooms.

In this case, sturdy arrangements in particular are advantageous as a result of the regularly rough environmental conditions on-site with, for example, weather-related maximum loads or in the case of large-scale applications. In addition, a method of operation which is assembly-friendly and gentle on resources is extremely important as a result of frequently necessary multiple arrangements of identical systems.

SUMMARY OF THE INVENTION

It is the object of the present invention to improve arrangements mentioned in the introduction in order to meet, in particular, the aforementioned main demands on the relevant systems in an advantageous manner.

The invention proceeds from a winding apparatus for covering an opening, in particular in a substantially vertical wall portion, the winding apparatus including a flat, flexible cover element for the at least partial covering of the opening, an elongated winding element which is rotatable with a drive unit and cooperates with the cover element, by way of which, in dependence on the direction of rotation of the winding element, the cover element can be wound onto the winding element and can be unwound again from the same, wherein there is present an adjusting unit which during the winding operation lowers or raises a movable top edge of the cover element without a winding operation of the movable top edge. The movable top edge is therefore in particular not wound or unwound but just lowered and raised in a translatory manner. The lowering of the top edge takes place in particular supported by the weight of the part of the cover element which connects downward on the top edge. When the cover element is wound, it is coiled in a spiral-shaped manner fitting tightly about the outer surface of the winding element, where applicable about layers of the cover element which have already been wound-on and thus forms a predominantly cylindrical winding on the winding element. In the case of the reverse direction of rotation of the winding element, when unwinding, the winding is once again correspondingly unwound in a controlled manner and the previously wound-on regions of the cover element are exposed again such that the regions are available in a flat manner for covering purposes.

The openings to be covered are realized for the most part on vertical portions or on somewhat inclined portions of walls or roof elements. Where applicable, lateral guides are provided for the lateral edges of the cover element to move along in a defined manner.

The essential aspect of the invention is that transmitting means are provided for interaction between the drive unit and the winding element, having a windable pulling element which is received between a first rotatable winding body and a second rotatable winding body in such a manner that the pulling element can be wound and unwound by way of the first winding body which is driveable by the drive unit, wherein the second winding body and the winding element are rotatably coupled together and wherein the cover element can be wound by way of an unwinding operation of the pulling element from the second winding body.

In this case, it is fundamental that the lowering and the raising movement of the top edge of the cover element are effected simultaneously with the winding operation of the cover element. By way of the transmitting means, an operative connection between the drive unit and the winding element to be driven can be set up over corresponding distances in a space-saving manner and with little expenditure. In particular, a very reliable, sturdy and nevertheless light and in the case of load peaks, where applicable, slightly yielding arrangement is provided.

A material-saving design for the interaction between the drive unit and the winding element in particular is possible. Also where applicable, spatial conditions, which exclude a straight-lined or simple rectangular connection between the drive unit and the winding element, can be easily operated according to the invention by way of a pulling element, the spatial development of which is easily adaptable in a multiple manner.

In addition, in spite of the high loadability in tension of, in particular, elongated thin pulling elements such as, for example, steel cables, a certain flexibility or compliance of the cover element in the direction opposed to the acting tensile load is possible with the pulling element. This can be advantageous, for example, in the case of shock like influences onto the cover element or devices connected thereon in order to prevent damage, which can otherwise occur in the case of static or almost rigid systems, for example, in the case of weather-dependent influences, such as squalls or snow loads and rain loads. Relating to this, arrangements with rigid connections to transmission shafts and gearing appropriate thereto are less tolerant and additionally comparatively expensive.

The pulling element, which extends in a tensioned manner between the winding bodies, is in particular in each case connected by way of one end to the first winding body and by way of another end to the second winding body. In the final winding states of the winding element, which corresponds to a completely lowered or completely raised cover element at the opening, the pulling element is wound at least on one winding body with at least a length which corresponds to the entire dimension of the opening to be bridged when viewed in the winding or unwinding direction. The pulling element can cooperate with the other winding body where applicable without coiling, as a rule however at a comparatively small still remaining angle of wrap. The necessary overall length of the pulling element accordingly corresponds at least to the relevant dimension of the opening in the direction of the movement of the top edge of the cover element, therefore in particular according to a vertical height of the wall opening to be covered.

An unwinding operation of the pulling element from the first winding body is effected at the same time as a winding operation of the pulling element on the second winding body and vice versa. A rotational movement coupling or transmission from the first winding body to the second winding body is effected with the driven winding of the pulling element or the winding operation taking place at the time. The second winding body is also coupled with the winding element in such a manner that a rotational movement of the winding element, which is effected forcibly when the cover element or the top edge is pulled up, brings about a rotational movement of the second winding body such that a pulling element length corresponding to that unwound from the first winding body at the same time is wound onto the second winding body and the pulling element remains tensioned. In a preferred manner, the second winding body is situated in a region laterally next to the cover element or laterally adjacent the winding element in a direction which is axial with respect to the rotational axis of the winding element.

The pulling element is in particular flexible and compliant or according to a round or other outer form of a winding body portion, onto which the pulling element can be wound and unwound, is adaptable to the winding body portion in a coiling manner.

The pulling element can be, in particular, one of a steel cable and another elongated, flexible or thin, where applicable, flat element.

In addition, it is advantageous for the first winding body to be driveable in a rotatable manner by the drive unit. The first winding body is, for example, received on a shaft portion which is drivable in a rotating manner by the drive unit. The shaft portion is, in particular, aligned in an at least almost horizontal manner, and is preferably positioned in the region of the drive unit itself. A compact arrangement can consequently be realized.

The winding bodies rotate in particular about a rotational axis which is aligned in each case in a preferred manner parallel to the rotational axis of the winding element. In a preferred manner, the winding bodies are provided with one of a cylindrical winding portion, a slightly cone-shaped winding portion and a conical winding portion, on which the pulling element can be wound.

In particular, the winding bodies are mounted so as to be exchangeable or detachable on a respective receiving means or the first winding body is mounted on the shaft portion. The winding bodies can have elevated edges on both sides such that the pulling element is not able to slip off sideways from the winding portion of the winding body.

A further advantageous variant of the invention is distinguished in that there is provided a fixedly positioned rotary shaft which is drivable in a rotatable manner by the drive unit, wherein the movable top edge of the cover element can be lowered or raised in dependence on the direction of rotation of the rotary shaft. Consequently, a sturdy and space-saving arrangement for raising and lowering the top edge of the cover element is realized. It is possible, in particular, over the length of the rotary shaft, which extends in particular continuously over the complete corresponding width of the opening, to act on arbitrary points along the entire top edge of the cover element for the movement thereof in the vertical direction.

The rotary shaft is in particular part of the adjusting unit.

In addition, according to an advantageous variant of the invention it is proposed that a windable pulling means, which is windable and unwindable in a drivable manner in such a manner that the movable top edge of the cover element can be raised and lowered in dependence on the winding progress, cooperates with the movable top edge of the cover element.

The arrangement is also to be associated with the adjusting unit. Consequently, a rotational movement is converted into a linear movement.

It is particularly advantageous for the windable pulling means to be able to be wound and unwound by means of the rotary shaft. The winding and unwinding of the pulling means is effected, for example, by means of a winding body which is rotatable with the rotary shaft and with which the pulling means cooperates by way of one end and is able to be wound and unwound, the non wound part of the pulling means being correspondingly shortened or lengthened and, in this case, moving the top edge of the cover element in the winding direction. To this end, the end of the pulling means not cooperating with the winding body cooperates with the edge of the top cover element.

This can be effected at a position which lies precisely centrally when viewed in particular over the width of the cover element or the top edge thereof. Two pulling means elements cooperating with at least two positions on the top edge is advantageous. The rotary shaft is aligned in particular in a horizontal manner, in particular positioned only a little above a top boundary of the opening to be covered parallel thereto.

In a preferred manner, the first winding body or the shaft portion on which the first winding body is present is positioned in extension of or, where applicable, in alignment with the rotary shaft. Where applicable, the shaft portion on which the first winding body is arranged forms part of the rotary shaft. The rotary shaft can, for example, extend so far laterally beyond a vertical, the vertical running in the region of a side edge of the cover element which extends in the vertical direction, that the first winding body can be positioned in the laterally protruding part or the part provides the shaft portion for receiving the first winding body. The rotary shaft can be formed from several fixedly connected part pieces.

The interaction between the rotary shaft and the top edge of the cover element can be developed, in particular, by way of a cable pull apparatus with at least one cable drum and one pulling cable for guiding the top edge upward or downward. In this case, the opening in the wall portion can be completely covered by way of the cover element pulled upward to the maximum. In this case, the cover element is unwound completely, as a rule, from the winding element. The cover element is wound on at the same time as the top edge is lowered. The winding is effected in a preferred manner, in particular, to the extent that the top edge is lowered such that a bottom edge of the cover element is not moved at least substantially up or down. Proceeding from the covered state of the opening, the arrangement provides a system that opens at the top or a system that closes upwards, with reference to a non-covered opening.

The achievement of using the winding operation of the rotary shaft to move the top edge is that the length of the free non-wound part of the pull cable between the cable drum and the top edge of the cover element changes corresponding to the winding progress, that is lengthened or shortened, such that the vertical height position of the top edge is determined or adjusted corresponding to the pull cable which is always tensioned or loaded in tension.

In addition, it is advantageous for the drive unit to be positioned in a stationary manner. Consequently, the drive unit, the weight of which in the case of larger units is not inconsiderable, can be fixed close to the opening and in a fixed and positionally secure manner for example on a building wall.

In addition, according to an advantageous embodiment of the object of the invention, the drive unit is realized in such a manner that the drive unit can be arranged on a wall portion in the region of a top boundary of the opening to be covered. In particular, a driven output journal of the drive unit, for example of an electric motor, can drive the rotary shaft in a rotatable manner without guide means by the positioning of the drive unit being such that the output journal and the rotary shaft are fixedly connectable together so as to be in alignment with one another.

In addition, mounting the drive unit in a region of the top opening boundary is, as a rule, advantageous with the effect that there is a relevant spacing to a bottom region of the wall portion close to the ground. Unfavorable conditions for the arrangement of the drive unit frequently prevail when the drive unit is set-up outside as, in the majority of cases, for example, an increased level of contamination or regular contact with rainwater or snow is to be observed in the agricultural area.

It is also advantageous for the winding element to cooperate in the region of a bottom edge of the cover element. Thus, in the case of a corresponding reciprocal harmonization between the rotation of the rotary shaft and of the winding element, the bottom edge, which is received on the winding element, can remain in a desired vertical position during the winding operation independently of the direction of rotation, apart from small compensating movements of the winding element occurring in practice together with, where applicable, winding wound thereon from wound regions of the cover element. For the shortening of the cover element brought about by the winding of the bottom part of the cover element is effected to the extent that the entire cover element is lowered according to the lowering of the top edge. The bottom edge of the cover element remains overlying when the top edge is lowered at least almost to the same vertical height. The result, where an opening was completely closed beforehand, is that the opening is only opened from above.

In the case of contra directional operation in each case with reversal of the rotating direction of the rotary shaft and of the winding element, which is effected in a controlled manner by means of a control unit for operating control of the drive unit, where applicable in cooperation with sensor means for detecting at least one of movement and positional data for components of the winding apparatus, the operations take place in the reverse manner. Accordingly, where the opening is completely uncovered or where the cover element is wound correspondingly on the winding element, the cover element winding on the winding element is unwound such that as a result the opening is covered in a flat manner from the bottom boundary, where the winding element is positioned, upwards by way of the raising of the top edge.

The winding element is advantageously fixed in its position with a small amount of play.

However, one variant is also possible where it is advantageous for the winding element to be guided so as to be displaceable along a predeterminable path of movement, e.g. is movable in the vertical direction or somewhat obliquely thereto. The scenario is in particular important in the case of a so-called center winding, which is explained again further below, or in the case of a winding operation of the cover element where the winding of the cover element is effected to an extent other than the lowering or raising path of the top edge. In this way, for example, systems can be realized where a raising of the bottom edge of the cover element takes place at the same time as the lowering of the top edge of the cover element.

It is also possible that in an advantageous manner the winding element, for adjusting the cover surface, is arranged in such a manner on the cover element that two part regions of the cover element which are arranged on both sides of the winding element can be wound or unwound at the same time onto or from the winding element. This includes, for example, a so-called center winding, where the winding element is arranged centrally on the cover element, which differs from the simple winding.

In the case of a simple winding, purely the bottom edge of the cover element cooperates with the winding element such that by way of the winding the region of the covering element connecting thereto can be wound progressively from the bottom edge or during unwinding beginning with the region of the cover element the furthest away from the bottom edge or the region last wound comes free again from the winding.

With the center winding, proceeding from the same number of revolutions and with the same winding circumference of the winding element, a surface of the cover element that is double the single winding can be wound or unwound again. The winding in the case of center winding is effected therefore in a more efficient or quicker manner compared to the corresponding single winding.

It is also advantageous for compensating means to be present in such a manner that the winding element is able to assume different positions transversely with respect to a longitudinal axis of the winding element. In this case, the difference must be made on the one hand between small possible positional changes of the winding element which do not necessarily change its position in the overall system, for example, to compensate for comparatively small running differences of the top edge and of the bottom edge of the cover element, and on the other hand between consciously or necessarily predetermined movement paths of the winding element as a considerable change in position of the winding element is brought about in a compulsory or wanted manner by way of the winding operation.

According to the first case, it is possible to compensate for voltage and/or force peaks in the system, by way of which a disconnecting movement of the winding element in the horizontal or vertical direction or inclined thereto is possible and consequently damage to the system is ruled out.

The second case relates in particular to defined guiding movements of the winding element in the direction in which the cover element is moved according to the lowering or raising of the movable top edge.

In an advantageous manner, the compensating means have at least one of a telescopic arrangement and an articulated arrangement between the second winding body and the winding element. In particular, it is advantageous when there is a telescopic articulated coupling present by way of which comparatively small relative movements between the second winding body and the winding element can be tolerated, the rotating coupling thereof not being impaired.

An advantageous modification of the object of the invention is distinguished in that the second winding body is mounted in a floating manner. In particular, it is advantageous for the second winding body to be only slightly vertically displaceable, for example within the millimeter range. Where applicable, the second winding body can be connected rigidly to the winding element so as to rotate together.

It is also advantageous for the compensating means to have a movable sliding element by way of which the second winding body can be guided along a predetermined path whilst the movable top edge of the cover element is lowered or raised. In particular, guide members for the linear guiding of the second winding body can be present, in particular for a movement in the vertical direction, for example by way of a rail arrangement which has a vertical rail along which the slide element, for example a guided slide, is movable.

In the case of alternative arrangements, it can be advantageous for the second winding body to be positionally fixed.

In addition, it is advantageous for there to be provided a back-pull arrangement which acts on the second winding body, by way of which a predeterminable force can be provided in order to move the winding element in a controllable manner when the top edge of the cover element is raised. The back-pull arrangement is advantageous both for the raising of the top edge of the cover element with the simultaneous unwinding of the wound part of the cover element, and for the reverse operation. By way of the back-pull arrangement a uniform movement of one of the cover element and the top edge of the cover element downwards can be effected. When raising the top edge of the cover element, one of the winding element and the cover element can be pulled upwards advantageously in particular in a non-uncontrolled manner or to too great an extent. The back-pull arrangement can include, for example, a cable pull arrangement with a back-pull winding body which rotates in common corresponding to the second winding body, one end of the cable pull cooperating with the back-pull winding body and being able to be wound and unwound on the back-pull winding body in dependence on the rotational movement of the second winding body, a second end of the cable pull being fixed in a tensioned manner at a fixed point.

A possible alternative to the back-pull arrangement, for example, with a suspended weight which, for example, acts permanently on the winding element must be provided with a comparatively heavy weight, which as a rule one would like to avoid in practice.

In addition, it is also advantageous that for a defined interaction between the movement of the top edge and the winding operation of the winding element, the winding diameter on the rotary shaft for the pulling means, the winding diameter for the pulling element and the winding diameter of the rotary shaft are selected so as to be matched to one another. It is also advantageous for the winding diameter of the back pull winding body to be determined in addition in a corresponding manner. In particular, it is advantageous for all the winding diameters to be comparable, in particular identical in the case of a single winding with a positionally fixed second winding body.

In the case of a center winding, with a winding element, which is movable according to the direction of movement of the top edge, the winding diameters on the rotary shaft for the pulling means and the winding diameter of the second winding body are in each case identical and twice as large as the respective winding diameters of the first winding body and the winding element. The winding diameter of a back pull winding body which is present where applicable is also in the order of magnitude of the first winding body.

An advantage of the winding apparatus according to the invention is that the drive motor can be arranged fixedly connected at the top to the rotary shaft above it. Consequently, installation space is saved. For example, only one comparatively small mini-telescope is required in order to compensate for a small running difference between the cover element and the pulling element. A small mini-telescope is economically advantageous.

The entire system is comparatively tolerant in relation to faults from outside which influence the winding process. In particular because the connection of the drive motor to, in particular, the second winding body when the same is received on a slide element is not released by means of the pulling element using mechanically meshing gear contours such as, for example, in the case of gear trains, but allows for a certain flexibility of movement, which is advantageous both in the case of a running drive unit and in the case of a standing drive unit.

In the case of the system according to the invention it is advantageous for the slide element or the slide with the second winding body to be comparatively light in weight. In particular, no drive motor has to be received and entrained on the slide.

When the top edge of the cover element is pulled upward, there is a considerable contribution to the transmission of torque as a result of a rotational transmission being effected onto the second winding body on the slide element by means of compensating means such as, for example, a mini-telescope with the unwinding of the winding element when the cover element is pulled upward.

BRIEF DESCRIPTION OF THE DRAWINGS

Further features and advantages of the invention are explained by way of the exemplary embodiments according to the invention shown in the drawings.

FIG. 5 shows a detail of the arrangement according to FIG. 2 from the front; and FIG. 6 shows a side view of the arrangement according to FIG. 5.

DETAILED DESCRIPTION OF THE INVENTION

Identical references are used in part in the figures for elements of the two exemplary embodiments which correspond per se.

Figure 1:
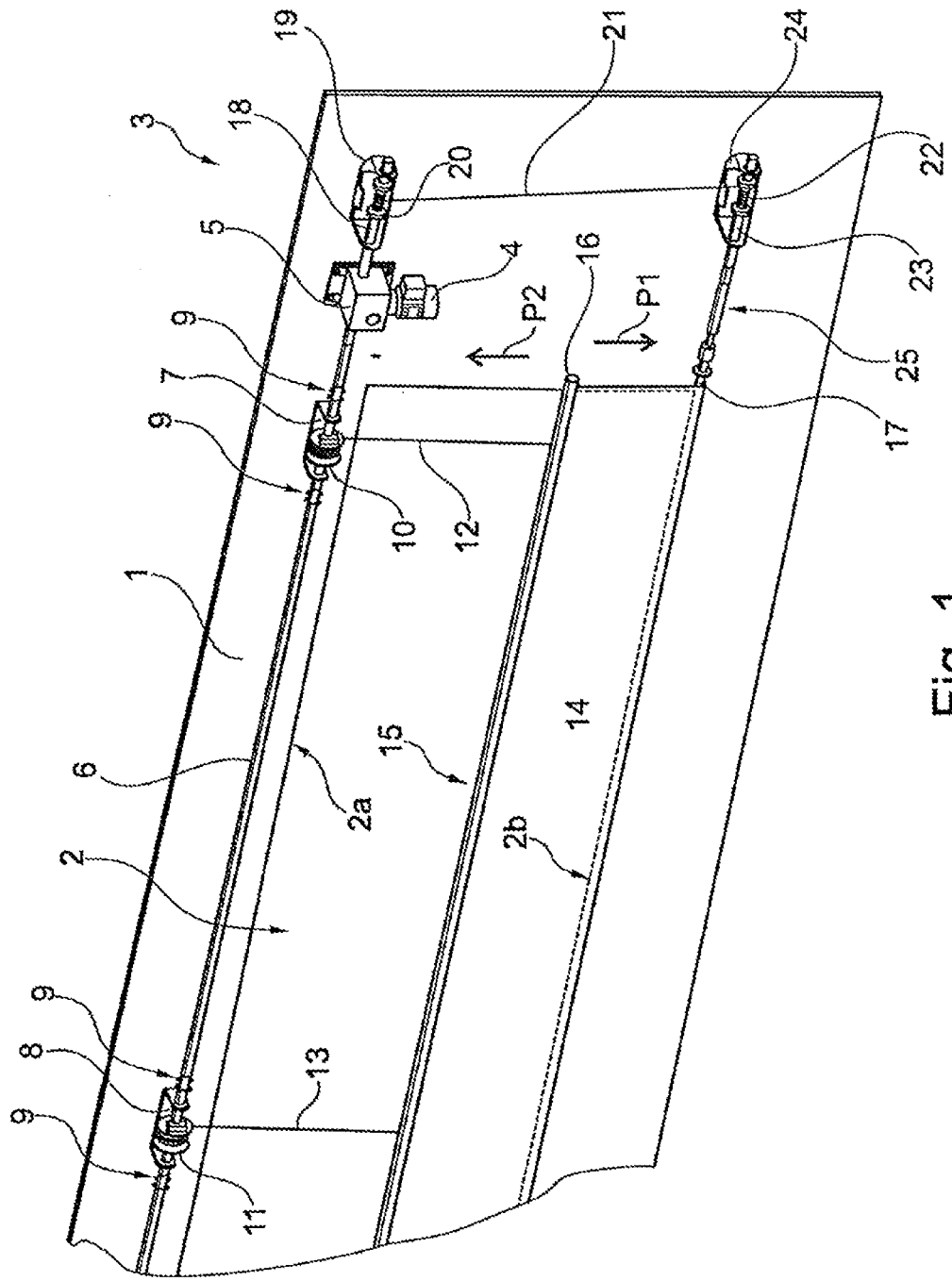
FIG. 1 shows a perspective part view obliquely from above onto an arrangement according to the invention on a wall element.

FIG. 1 shows a building wall 1 in a vertical alignment with a building opening 2, in this case rectangular, the opening 2 including a winding apparatus 3 according to the invention only being shown in part. The winding apparatus 3 can serve, for example, for sometimes covering or covering in part the building opening 2 in the building wall 1 in a stable building or a greenhouse.

The winding apparatus 3 is present on the outside of the building wall 1 to cover the building opening 2. The winding apparatus 3 or the winding Venetian shutter includes a fixedly positioned drive motor 4, in this case, for example, an electrically-operated motor. The drive motor 4 drives a rotary shaft 6 in a selective manner in two opposing directions of rotation by means of a gearing 5. The rotary shaft 6 is fixedly, but rotatably, received on the building wall 1 by means of corresponding bearing clips 7, 8 somewhat above a top edge 2a of the building opening 2 aligned approximately parallel to the edge 2a or horizontally. The bearing clips 7 and 8 are, for example, approximately U-shaped sheet elements with receiving lugs which protrude forward at right angles to the building wall 1 with openings for the rotary shaft 6 to pass through. The rotary shaft 6 is, for example, assembled from individual part pieces by means of connecting elements 9, the individual part pieces of the rotary shaft 6 being connected to one another in a non-rotatable manner by means of the connecting elements 9.

Two winding drums 10, 11 are fixedly received, in this case, on the rotary shaft 6 as an example such that when the rotary shaft 6 rotates, the winding drums 10, 11 also rotate correspondingly at the same time. The winding drums 10, 11 are positioned, in this case, in the region of the bearing clips 7 and 8 between the protruding receiving lugs. A pull cable 12 or a pull cable 13 is received on the winding drums 10 and 11 in each case in the same manner so as to be windable or unwindable. Accordingly, one end of the pull cable 12 is received on the winding drum 10 or one end of the pull cable 13 is received on the winding drum 11 and when a building opening 2 is closed by a cover element 14 is wound onto the associated winding drum 10 or 11.

FIG. 1 shows the cover element 14 for instance when a building opening 2 is half opened from above such that a bottom region of the building opening 2 is covered by part of the cover element 14, in particular at a small spacing in front of the building wall 1.

In this case, a top edge 15 of the cover element 14 is realized with a continuous rigid profile 16 on which over the entire width of the cover element 14 this latter cooperates with the profile 16. The top edge or the profile 16 are accordingly held in such a manner by means of the pull cables 12, 13 that the top edge 15 or the profile 16 is aligned at least almost parallel to the top edge 2a of the building opening 2 or to the rotary shaft 6.

In the case of the building opening 2 shown in FIG. 1 which is not covered in part by the cover element 14, part of the pull cables 12 and 13 are still wound on the associated winding drums 10 and 11 such that when the rotary shaft 6 rotates correspondingly, driven by the drive motor 4, a further pull cable length is unwound and consequently the top edge 15 with the cover element 14 mounted thereon is lowerable downward according to arrow P1. If the rotary shaft 6 is driven in a rotating manner in the reverse direction by the drive motor 4, the pull cables 12, 13 are wound by means of the winding drums 10, 11 such that the cover element 14 or the edge 15 is raised upward according to arrow P2 and consequently the building opening 2 can be closed.

So that the cover element 14 with its bottom edge, which is not visible and which is received on a winding shaft 17 over its complete width, is not also lowered when the top edge 15 is lowered, the winding shaft 17 is rotatingly driven in a corresponding manner in a direction such that the cover element 14 with its bottom edge is wound on the winding shaft 17 corresponding to the extent of the section over which the top edge 15 is lowered downward according to arrow P1.

Figure 3:
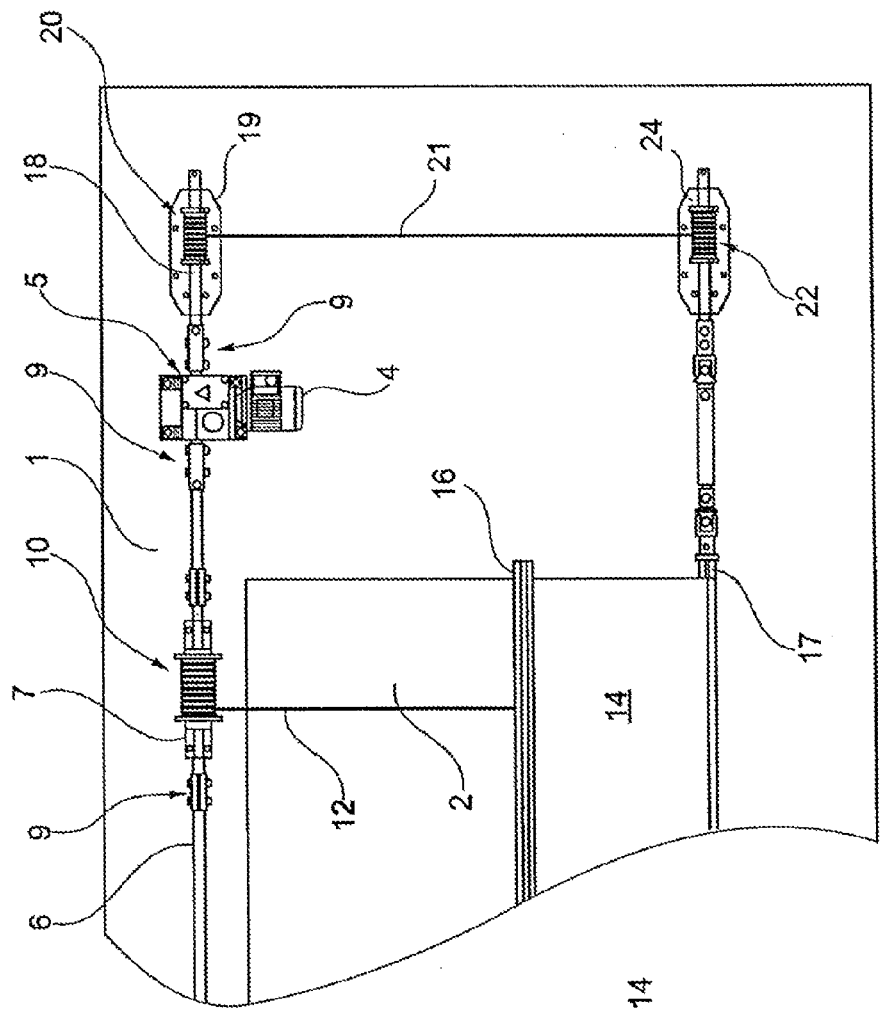
FIG. 3 shows a detail of the arrangement according to FIG. 1 from the front.
Figure 4:
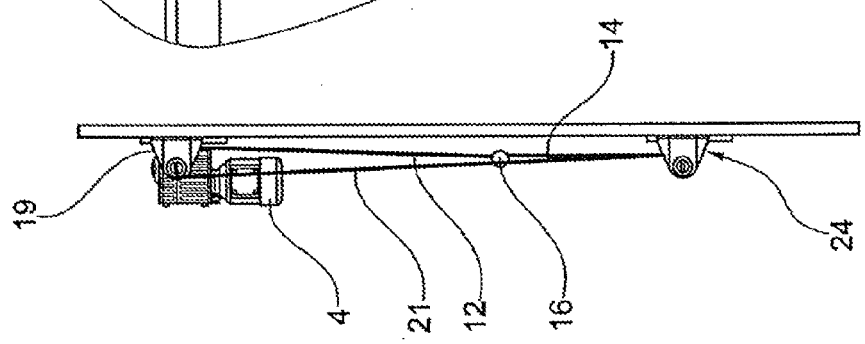
FIG. 4 shows a side view of the arrangement according to FIG. 3.

The winding shaft 17 is also rotatingly driven by means of the drive motor 4 in both different directions of rotation. This is effected, however, by way of different operating mechanisms. A more detailed front view of the arrangement is shown in FIG. 3, and a side view of the arrangement is shown in FIG. 4.

In addition, there is provided a shaft portion 18 which is realized in alignment with the rotary shaft 6 and is received in a rotatable but fixedly positioned manner on the building wall 1 by means of a further bearing clip 19. A first winding body 20, which is realized in diameter corresponding to the winding drums 10, 11, is received on the shaft portion 18. A pulling element 21 which is windable and unwindable by means of driven rotation of the winding body 20, cooperates with the winding body 20. A first end of the pulling element 21 is fixed on the winding body 20 for this purpose. The other bottom end of the pulling element 21 is fixed on a bottom or second winding body 22 such that in the case of the tensioned arrangement of the pulling element 21 shown between the winding bodies 20 and 22, a corresponding rotation of the winding body 20 brings about a winding of the pulling element 21 onto the first winding body 20 and consequently an unwinding of part of the pulling element 21 on the winding body 22, the winding body 22 being made to rotate. This occurs coupled with the lowering of the top edge 15. The winding body 22 is received fixedly on a shaft portion 23 and so as to rotate together with the shaft portion 23, the shaft portion 23 being received so as to be rotatable in a bearing clip 24 which is present in a fixedly fixed manner on the outside of the building wall 1. The shaft portion 23 is rotatingly coupled with the winding shaft 17 by means of a connecting portion 25. In particular, the shaft portion 23 is positioned with the winding body 22 in a laterally offset manner in the region in which a bottom edge 2b of the building opening 2 is present. In particular, the shaft portion 23 is aligned parallel to one of the shaft portion 18 and the rotary shaft 6.

To compensate for small positional differences of the winding shaft 17 in relation to the shaft portion 23, the connecting portion 25 is realized in such a manner that a displacement movement of the winding shaft 17 in particular in the direction P1 or P2 or at right angles thereto is possible in the direction away from or toward the building wall 1. The connecting portion 25 is developed in this case, for example, advantageously as a mini-telescope or as a telescopic articulated arrangement.

This includes a center portion, which is received on both sides, for example, in an articulated manner and is mounted on both sides so as to be deflectable by means of articulated portions at the one end on the shaft portion 23 and on the other end on the winding shaft 17.

In operation, however, it is such that the diameters of the winding drums 7, 8 or of the winding bodies 20 and 22 are matched to one another in the same way in diameter in such a manner that the winding shaft 17 remains in its position in the vertical direction at least such that the bottom edge 2b of the building opening 2 always remains covered by part of the cover element 14 such that simply the top edge 15 is displaceable by means of its movement in the direction P1 or P2 and consequently the building opening 2 is opened from above or closed upward.

If then, for example, from the situation shown in FIG. 1 where the building opening 2 is approximately half open or half closed, the top edge 15 is moved upward by winding the pull cables 12 and 13 onto the winding drums 10 and 11, the building opening 2 is closed. In this case, the drive unit 4 rotates the winding body 20 at the same time in such a manner that the pull cable 21 which was wound on the first winding body 20 is unwound therefrom.

A corresponding part of the pull cable 21 is wound onto the second winding body 22 at the same time such that the pull cable 21 always remain tensioned or is pretensioned again. The rotation of the second winding body 22 is generated as a result of the wound part of the cover element 14 unwinding from the winding shaft 17 due to the force of gravity when the cover element 14 is pulled up, which is effected with the moving of the top edge 15 upwards, by way of which a rotation of the winding shaft 17 takes place. This is effected to the extent that the top edge 15 is moved upward such that overall the winding shaft 17 remains at least almost in its vertical position and the building opening 2 remains covered by the cover element 14 from the top edge 15 as far as up to the bottom edge 2b, the winding shaft 17 running substantially parallel to the bottom edge 2b. With the rotation of the winding shaft 17, the second winding body 22 is also rotated by means of the connecting portion 25 such that the pull cable 21 is wound onto the winding body 22, corresponding to the length of the pull cable unwound from the winding body 20.

Figure 2:
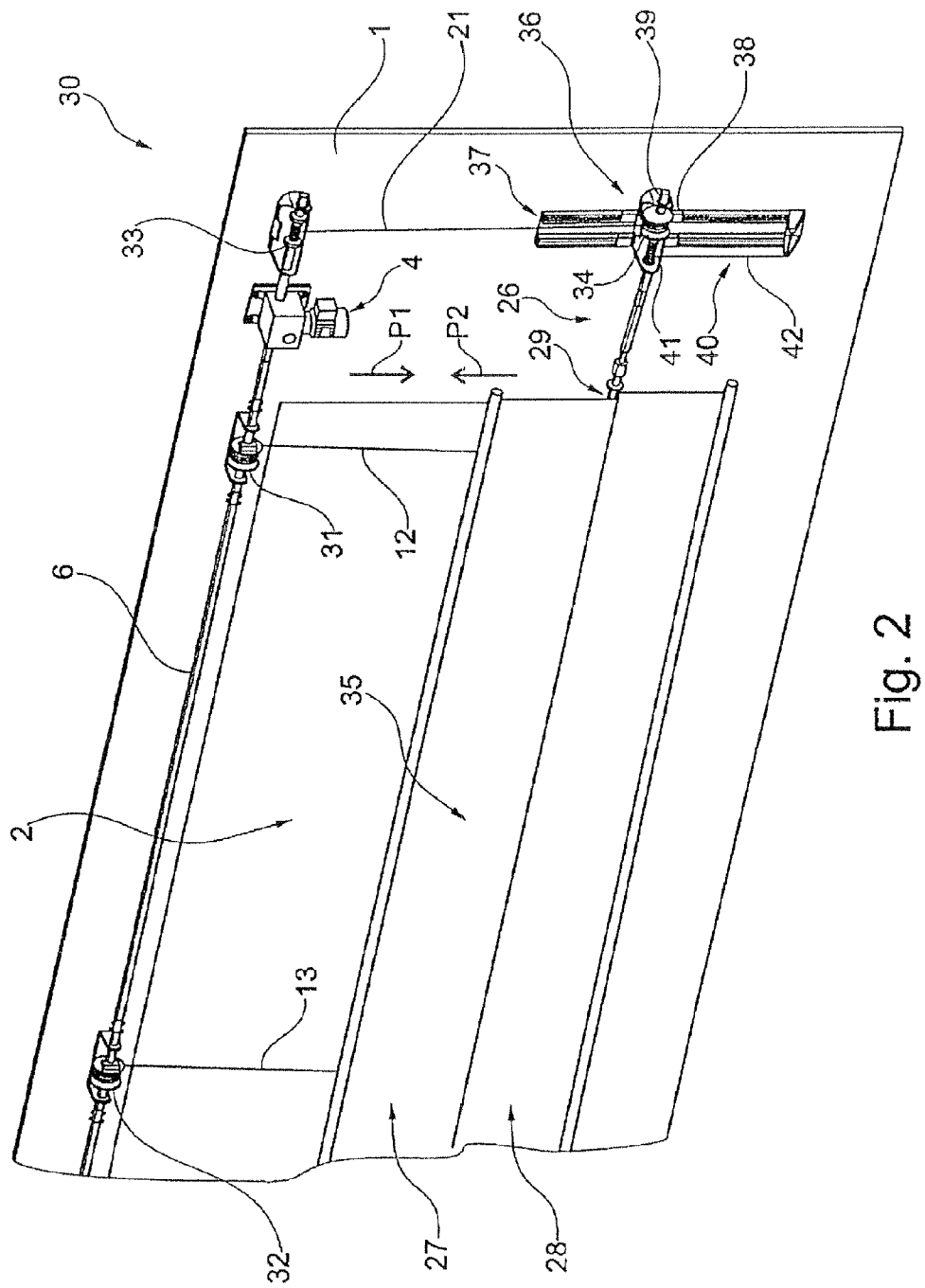
FIG. 2 shows an alternative arrangement according to the invention according to the view of FIG. 1 on a wall element.

An alternative arrangement to FIG. 1 with the identical alignment is shown in FIG. 2.

In this case a center winding 26 is realized, by way of which the cover element 35 can be wound by means of a top and a bottom part region 27, 28 of the cover element 35. Since in the case of the center winding 26, a winding shaft 29 winds the top part region 27 and the bottom part region 28 at the same time or unwinds the two part regions 27, 28, which are already wound on the winding shaft 29, at the same time, the corresponding diameters or consequently circumferences of winding portions of the arrangement are adapted according to the winding apparatus 30 from FIG. 2. For this purpose, the winding drums 31, 32, which are present on the rotary shaft 6, are realized with twice the diameter to form a winding body 33 and the winding body 34, which is positioned further down, has the diameter of the winding drums 31, 32. The dimensions of the arrangement according to the winding apparatus 30 are otherwise comparable or identical to the arrangement according to the winding apparatus 3. A more detailed front view of the alternative arrangement is shown in FIG. 5, and a side view of the alternative arrangement is shown in FIG. 6.

Compared to a revolution of the winding shaft 17 according to FIG. 1, the cover element 35 in the winding apparatus 30 realizes twice the height per revolution of the winding shaft 29. A rail arrangement 36 is realized for a vertical guiding movement of the winding body 34 during winding and unwinding of the cover element 35. The rail arrangement 36 includes a guide rail 37 which is provided with vertical guide contours and has a guide slide 38 which is movable vertically thereon. A shaft portion 39 is rotatably received on the guide slide 38, the winding body 34 being fixedly connected to the shaft portion 39 so as to be rotatable. The interaction between the shaft portion 39 and the winding shaft 29 is otherwise effected in the manner according to the arrangement from FIG. 1. A weight can be suspended on the guide slide 38 for a counter bearing arrangement of the guide slide 28. Instead of this, FIG. 2 realizes an arrangement with a pull cable arrangement 40 which is fixed at the bottom. The pull cable arrangement 40 includes a further winding body 41 with a cable 42 which can be wound thereon or unwound therefrom and is fixed to the other end on the bottom portion of the guide rail 37. The pull cable arrangement 40 has, in particular, nothing to do with torque transmission onto the winding shaft 29 or the winding body 34.

The diameter of the winding body 41 is identical to the diameter of the winding body 33.

Thus is achieved that a certain pulling force can always be applied to the shaft portion 39 or the winding shaft 29 is not pulled upward in the direction P2 when the building opening 2 is closed.

LIST OF REFERENCES

1 Building wall
2 Building opening
2a Edge
2b Edge
3 Winding apparatus
4 Drive motor
5 Gearing
6 Rotary shaft
7 Bearing clip
8 Bearing clip
9 Connecting element
10 Winding drum
11 Winding drum
12 Pull cable
13 Pull cable
14 Cover element
15 Edge
16 Profile
17 Winding shaft
18 Shaft portion
19 Bearing clip
20 Winding body
21 Pull element
22 Winding body
23 Shaft portion
24 Bearing clip
25 Connecting portion
26 Center winding
27 Part region
28 Part region
29 Winding shaft
30 Winding apparatus
31 Winding drum
32 Winding drum
33 Winding drum
34 Winding drum
35 Cover element
36 Rail arrangement
37 Guide rail
38 Guide slide
39 Shaft portion
40 Pull cable arrangement
41 Winding body
42 Cable

The invention claimed is:

1. A winding apparatus for covering an opening in a wall portion comprising: exactly one drive unit, a flat, flexible cover element for the at least partial covering of the opening, an elongated winding element that is rotatable by way of the drive unit and cooperates with the cover element and by way of which, in dependence on the direction of rotation of the winding element, the cover element can be wound onto the winding element and can be unwound again from the winding element, an adjusting unit that, during the winding operation lowers or raises a movable top edge of the cover element without a winding operation of the movable top edge, and transmitting means provided for interaction between the drive unit and the winding element, having a windable pulling element which is received between a first rotatable winding body and a second rotatable winding body in such a manner that the pulling element can be wound and unwound by way of the first winding body which is driveable by the drive unit, wherein the second winding body and the winding element are rotatably coupled together, wherein the cover element can be wound by way of an unwinding operation of the pulling element from the second winding body, and wherein the winding element, for adjusting the cover surface, is arranged in such a manner on the cover element that two part regions of the cover element, which are arranged on both sides of the winding element, can be wound or unwound at the same time one of onto and from the winding element.

2. The winding apparatus according to claim 1, further comprising a fixedly positioned rotary shaft which is drivable in a rotating manner by the drive unit, wherein the movable top edge of the cover element can be lowered or raised in dependence on the direction of rotation of the rotary shaft.

3. The winding apparatus according to according claim 1, further comprising a windable pulling means, which is windable and unwindable in a drivable manner in such a manner that the movable top edge of the cover element can be raised and lowered in dependence on the direction of rotation of winding element, cooperates with the movable top edge of the cover element.

4. The winding apparatus according to claim 3, further comprising a fixedly positioned rotary shaft which is drivable in a rotating manner by the drive unit, wherein the windable pulling means can be wound and unwound by means of the rotary shaft.

5. The winding apparatus according to claim 1, wherein the drive unit is positioned in a stationary manner.

6. The winding apparatus according to claim 1, wherein the drive unit is arranged on the wall portion in the region of a top boundary of the opening to be covered.

7. The winding apparatus according to claim 1, wherein the winding element cooperates in the region of a bottom edge of the cover element.

8. The winding apparatus according to claim 1, further comprising compensating means that enable the winding element to assume different positions transversely with respect to a longitudinal axis of the winding element.

9. The winding apparatus according to claim 8, wherein the compensating means have at least one of a telescopic arrangement and an articulated arrangement between the second winding body and the winding element.

10. The winding apparatus according to claim 1, wherein the second winding body is mounted in a floating manner.

11. The winding apparatus according to claim 9, wherein the compensating means have a movable sliding element by way of which the second winding body can be guided along a predetermined path whilst the movable top edge of the cover element is one of lowered and raised.

12. The winding apparatus according to claim 1, wherein the second winding body is positionally fixed.

13. The winding apparatus according to claim 8, further comprising a back-pull arrangement which acts on the second winding body and by way of which a predeterminable force can be applied to the compensating means in order to move the winding element in a controllable manner when the top edge of the cover element is lowered and when it is raised.

* * * * *